United States Patent
Baechler

(10) Patent No.: US 9,075,076 B2
(45) Date of Patent: Jul. 7, 2015

(54) SENSOR APPARATUS AND METHOD FOR DETERMINING PEDALLING CADENCE AND TRAVELLING SPEED OF A BICYCLE

(75) Inventor: Herbert Baechler, Meilen (CH)

(73) Assignee: AR INNOVATION AG, Stafa (CH)

( * ) Notice: Subject to any disclaimer, the term of this patent is extended or adjusted under 35 U.S.C. 154(b) by 88 days.

(21) Appl. No.: 13/879,219

(22) PCT Filed: Oct. 15, 2010

(86) PCT No.: PCT/EP2010/065537
§ 371 (c)(1),
(2), (4) Date: Apr. 12, 2013

(87) PCT Pub. No.: WO2012/019654
PCT Pub. Date: Feb. 16, 2012

(65) Prior Publication Data
US 2013/0205896 A1    Aug. 15, 2013

(51) Int. Cl.
*G01P 3/50*    (2006.01)
*B62J 99/00*   (2009.01)
*G01C 22/00*   (2006.01)
*G01P 1/02*    (2006.01)

(52) U.S. Cl.
CPC . *G01P 3/50* (2013.01); *B62J 99/00* (2013.01); *B62J 2099/0013* (2013.01); *B62J 2099/002* (2013.01); *B62K 2207/00* (2013.01); *G01C 22/002* (2013.01); *G01P 1/023* (2013.01)

(58) Field of Classification Search
None
See application file for complete search history.

(56) References Cited

U.S. PATENT DOCUMENTS

| | | |
|---|---|---|
| 3,898,563 A | 8/1975 | Erisman |
| 4,526,036 A | 7/1985 | Morrison |
| 5,089,775 A | 2/1992 | Takeda |
| 5,644,511 A * | 7/1997 | McWhorter ................. 702/148 |
| 5,737,247 A * | 4/1998 | Baer et al. ................... 340/432 |
| 6,188,215 B1 | 2/2001 | Muraoka et al. |

(Continued)

FOREIGN PATENT DOCUMENTS

| | | |
|---|---|---|
| DE | 20 2006 017968 U1 | 2/2007 |
| EP | 1 213 561 A1 | 6/2002 |

(Continued)

OTHER PUBLICATIONS

International Search Report for PCT/EP2010/065537 dated Jul. 14, 2011.

(Continued)

*Primary Examiner* — Hezron E Williams
*Assistant Examiner* — Mark A Shabman
(74) *Attorney, Agent, or Firm* — Pearne & Gordon LLP

(57) ABSTRACT

A sensor (1) for determining both a cadence of a crank and a travelling speed of a bicycle includes an accelerometer (4) providing a first signal dependent on a first acceleration along a first measurement axis (z) and a second signal dependent on a second acceleration along a second measurement axis (y) perpendicular to the first measurement axis. The accelerometer (4), a wireless transmitter (6) and a power source (8) are contained in a housing (2) that can be attached to a wheel of the bicycle. The sensor (1) determines the cadence from the rate at which consecutive changes of polarity occur in the first signal, or from the rate at which consecutive positive and negative extreme values occur in the first signal. The sensor also determines the travelling speed from the rate at which consecutive maximum and minimum extreme values occur in the second signal.

13 Claims, 3 Drawing Sheets

(56) References Cited

U.S. PATENT DOCUMENTS

| | | |
|---|---|---|
| 6,331,771 B1 | 12/2001 | Muraoka et al. |
| 6,957,926 B2 | 10/2005 | Okuda |
| 2004/0189722 A1* | 9/2004 | Acres .......................... 345/866 |
| 2008/0252038 A1 | 10/2008 | Blomme et al. |

FOREIGN PATENT DOCUMENTS

| | | |
|---|---|---|
| EP | 1 508 514 A1 | 2/2005 |
| EP | 1 923 302 A1 | 5/2008 |
| WO | 2004/057274 A1 | 7/2004 |
| WO | 2008/058164 A2 | 5/2008 |
| WO | 2009/007498 A1 | 1/2009 |
| WO | 2010/000369 A1 | 1/2010 |

OTHER PUBLICATIONS

Written Opinion for PCT/EP2010/065537 dated Jul. 14, 2011.

* cited by examiner

SENSOR APPARATUS AND METHOD FOR DETERMINING PEDALLING CADENCE AND TRAVELLING SPEED OF A BICYCLE

TECHNICAL FIELD

The present invention relates to a sensor apparatus for a bicycle for determining both the cadence with which a bicyclist is pedalling as well as the travelling speed of the bicycle. Furthermore, the present invention pertains to a corresponding method for determining both a bicyclist's pedalling cadence as well as a bicycle's travelling speed.

BACKGROUND OF THE INVENTION

Commonly used apparatuses for measuring the travelling speed of a bicycle consist of a magnet attached to a spoke of the front or rear wheel and a sensor such as a magnetic reed switch or Hall effect sensor attached to the fork or rear part of the frame, for instance to the chain stays or the seat stays. The sensor detects when the magnet passes by as the wheel rotates. The travelling speed is then determined from the distance travelled during a revolution of the wheel, which is equal to the circumference of the wheel, and the time it takes for a full revolution of the wheel, e.g. the time between consecutive passages of the magnet past the sensor. Similarly, the rate at which the bicyclist is pedalling, i.e. the cadence, is typically measured using a magnet mounted on a crank or a chain wheel (also termed front or drive sprocket) and a sensor mounted on the frame, again by sensing passages of the magnet past the sensor, and then determining the number of revolutions of the crankset per unit of time from the elapsed time between consecutive passages of the magnet past the sensor.

Such a prior art solution is described in U.S. Pat. No. 3,898,563 where the use of two separate sensor/magnet arrangements is proposed, one mounted at the front wheel for measuring the travelling speed and the other mounted at the drive sprocket for measuring the cadence.

In order for such a measurement arrangement to function properly it is important that the magnet be exactly aligned with the sensor. Furthermore, the correct operation of this type of measurement arrangement is critically dependent on a careful adjustment of the distance between the magnet and the sensor, since the sensor will only detect the presence of the magnet reliably if it is in close proximity to the sensor. Unfortunately, even when the sensor and magnet are accurately positioned relative to one another during installation of the arrangement on the bicycle, their alignment and the distance between them is very often shifted over the course of time. This can for instance be due to manipulations of the bicycle, e.g. when loading and unloading the bicycle from a car, which frequently requires removing and subsequently reattaching one of the bicycle's wheels, or due to vibrations and impacts acting on the bicycle during its operation. Such displacements between the sensor and the magnet will eventually inhibit the arrangement from functioning correctly, which is especially annoying during a bicycle trip and in particular during a race. Oftentimes, re-adjusting the arrangement requires use of a tool, which may not be at hand whilst riding the bicycle.

A number of solutions have been suggested to alleviate these problems. In U.S. Pat. No. 5,089,775, U.S. Pat. No. 6,188,215 B1 and U.S. Pat. No. 6,331,771 B1 magnet mounting assemblies are proposed which seek to increase the mounting stability of a magnet at a spoke of a bicycle wheel. U.S. Pat. No. 6,957,926 B2 provides a magnet mounting structure which does not require use of a tool to mount or adjust the mounting of a magnet at a spoke of a bicycle wheel. On the other hand EP 1 508 514 A1 and EP 1 923 302 A1 disclose apparatuses including both a speed sensor as well as a cadence sensor to be arranged at a chain stay, thus avoiding having to arrange two separate sensors individually and also seeking to ensure a stable and accurate mounting of both sensors. Furthermore, US 2008/0252038 A1 describes a bicycle frame having a cavity constructed to receive a sensor device, thus allowing to maintain the aerodynamic contour of the frame whilst the sensor device is securely held and accurately positioned in the cavity. The disadvantage of this approach being that by forming a cavity in a frame the stability of the frame structure can potentially be impaired. Moreover, WO 2004/057274 A1 discloses a solution where a magnet and a sensor are integrated into parts of a bicycle. In WO 2004/057274 A1 it is proposed to arrange the magnet of a speedometer internally of a tyre of a bicycle wheel and to securely connect a sensor to the lower end of the steering column, i.e. between the top ends of the two front forks. Further, it is also proposed to arrange a magnet of a pedal revolution counter (for measuring the cadence) on the lateral surface of the spindle within the bottom bracket and to connect the sensor to the frame of the bicycle, e.g. at a bottom end of the seat tube or down tube. With such an arrangement both the magnet and sensor are well protected, but with the disadvantage that both components are poorly or not at all accessible in case repair or replacement is necessary.

Alternative means to measure either the travelling speed or the pedalling cadence of a bicycle are also known. U.S. Pat. No. 4,526,036 discloses a cadence meter comprising means for measuring acceleration intended to be mounted on a non-rotating part of a bicycle. The cadence is determined based on measuring the alternating phases of acceleration and de-acceleration of the bicycle in its direction of travel caused by the changing force applied to the pedals by the bicyclist during each pedalling cycle. A similar technique is employed in the measurement device described in EP 1 213 561 B1. This measurement device includes an accelerometer, which is mounted on a bicycle such that its measurement axis coincides with the direction of travel, the output signal of which is processed in order to extract the frequency of pedalling (i.e. the cadence). Furthermore, WO 2008/058164 A2 presents a crankset based bicycle power measuring device wherein the pedalling cadence is required as part of the power calculation. In conjunction with determining the pedalling cadence, it is mentioned that an accelerometer mounted on a crankset can be used to measure the direction of gravity relative to the orientation of the crank. In WO 2010/000369 A1 the use of an accelerometer in a device for measurement of cycling power output is described, wherein the accelerometer is embedded in a bicycle cleat bolted to a bicyclist shoe or alternatively mounted on a pedal of a bicycle or a leg or foot of a bicyclist. Thereby, the accelerometer is mounted such that its two measurement axes span a plane which is parallel to the two parallel planes of rotation of the cranks. In WO 2010/000369 A1 it is suggested to determine the cadence based on the elapsed time between measuring consecutive minimum and maximum values, respectively, of the output signals from the accelerometer, which occur at the top dead centre and bottom dead centre, respectively, of each revolution of the cranks.

SUMMARY OF THE INVENTION

It is an object of the present invention to provide a sensor apparatus for measuring both a bicyclist's pedalling cadence as well as the bicycle's travelling speed and having a reduced number of parts. It is furthermore an aim of the present invention to provide a sensor apparatus which functions reliably even when its position is shifted. It is another object of the present invention to provide an alternative method for determining both a bicyclist's pedalling cadence as well as the travelling speed of a bicycle.

At least these objects are achieved by a sensor apparatus comprising the features and steps recited in the claims. Preferred embodiments as well as a use are given in further claims.

The present invention provides a sensor apparatus for determining both a cadence of a crank and a travelling speed of a bicycle, comprising:
- a housing;
- an accelerometer with a first and second measurement axis arranged substantially perpendicular to one another, capable of providing a first signal dependent on a first acceleration along the first measurement axis and a second signal dependent on a second acceleration along the second measurement axis;
- a wireless transmitter;
- a power source;

wherein the accelerometer, the wireless transmitter and the power source are contained in the housing, and wherein the housing comprises an attachment means for attaching the housing to a wheel of the bicycle, and wherein the sensor apparatus further comprises a first means for determining the cadence from the rate at which consecutive changes of polarity occur in the first signal, or from the rate at which consecutive positive and negative extreme values occur in the first signal, and a second means for determining the travelling speed from the rate at which consecutive maximum and minimum peak values occur in the second signal.

Such a sensor apparatus according to the present invention is capable of measuring both a bicyclist's pedalling cadence as well as the bicycle's travelling speed using a single 2- or 3-axis accelerometer attached to a wheel of a bicycle, thus requiring less parts than known solutions and making the installation of such a sensor apparatus simpler, quicker and more convenient. Easy installation is further supported by the fact that correct and reliable functioning of a sensor apparatus according to the present invention is not critically dependent on where exactly it is mounted on a wheel and is insensitive with respect to shifts of its position. The first means determines the cadence with which a bicyclist is pedalling based on the elapsed time between occurrences of consecutive alternations of the sign in the first acceleration signal or based on the elapsed time between occurrences of consecutive positive and negative extreme values in the first signal. This feature makes implementation of the present invention especially simple and thus low cost. Moreover, the second means determines the travelling speed of the bicycle based on the elapsed time between occurrences of consecutive maximum and minimum peak values in the second acceleration signal. This feature also allows for a simple implementation, thus enabling to realise cost-efficient sensor solutions for bicycles capable of determining both crank cadence and travelling speed.

In an embodiment of the present invention the sensor apparatus further comprises a third means for determining the cadence from the rate at which consecutive maximum and minimum peak values occur in the envelope of the second acceleration signal. In this way a second value for the cadence is determined from the second acceleration signal independent of the first cadence value determined from the first signal.

In further embodiments of the present invention the sensor apparatus further comprises a fourth means for determining a more accurate and/or more reliable cadence value using the cadence value determined by the first means and the cadence value determined by the third means. This embodiment is fault-tolerant since in cases where the acceleration measurement of the accelerometer temporarily fails or permanently break-down along one of its measurement axes the alternate, redundant measurement can be employed to provide the cadence value. Alternatively, by appropriately combining two independently determined cadence values a more precise result can be achieved.

In an aspect of the present invention a bicycle wheel with a sensor apparatus according to the present invention is provided, wherein the first measurement axis is oriented substantially parallel to the axle of the wheel and the second measurement axis is oriented substantially perpendicular to the axle. In this way the sideways accelerations from which the pedalling cadence is determined by the first means can be measured independently of any accelerations acting in the longitudinal plane of the bicycle where the latter accelerations are measured in order to determine the travelling speed with the second means.

In a further aspect of the present invention the sensor apparatus is arranged such at the bicycle wheel that the second measurement axis intersects the axis of the axle. In this way radial forces acting on the accelerometer can be measured independently of tangential forces, thus making the result of the determination of the rate at which the wheel rotates more reliable or more easily determinable in the first place.

In further embodiments of the sensor apparatus according to the present invention the first and second means are part of a bicycle computer or a portable device such as for instance a mobile phone or a personal digital assistant (PDA). Instead of providing the first and second means within the housing, it can be more cost-efficient to include the functions performed by these two means in a bicycle computer, for instance by incorporating corresponding software modules into the program being executing on a microprocessor in a bicycle computer. In the same way the third and fourth means can also be included as part of a bicycle computer or a portable device such as for instance a mobile phone or a PDA.

In another aspect of the present invention a bicycle with a sensor apparatus according to the present invention is provided, wherein the housing is attached to a wheel of the bicycle, for instance a rear wheel, and wherein the first measurement axis of the accelerometer is oriented substantially parallel to the axle of the wheel to which the sensor apparatus is attached and the second measurement axis of the accelerometer is oriented substantially perpendicular to the axle of the wheel to which the sensor apparatus is attached. By attaching the housing to the rear wheel of a bicycle sideways accelerations, i.e. those acting at a right angle with respect to the travelling direction of the bicycle, can be more reliably detected than at the front wheel onto which additional dominant lateral steering forces may also be acting. The cadence can be determined from the periodic sideways "rocking" motion of the bicycle caused by the alternating forces applied to the left and right pedal by the bicyclist during each pedalling cycle and due to the bicyclist's periodic weight transfer resulting therefrom. Furthermore, the housing is for instance arranged such at the bicycle wheel that the second measurement axis intersects the axis of the axle. In this way radial forces acting on the accelerometer can be measured independently of tangential forces, thus making the result of the determination of the rate at which the wheel rotates more reliable or more easily determinable in the first place.

In a further aspect of the present invention a corresponding method for determining both a cadence of a crank and a travelling speed of a bicycle using an accelerometer attached to a wheel of the bicycle such that a first measurement axis of the accelerometer is oriented substantially parallel to an axle of the wheel and a second measurement axis of the accelerometer is oriented substantially perpendicular to the axle of the wheel is provided, comprising the steps of:

a) measuring a first signal dependent on a first acceleration along the first measurement axis;
b) measuring a second signal dependent on a second acceleration along the second measurement axis;
c) determining the cadence value from the rate at which consecutive changes of polarity occur in the first signal, or from the rate at which consecutive positive and negative extreme values occur in the first signal;
d) determining the travelling speed value from the rate at which consecutive positive and negative extreme values occur in the second signal.

In an embodiment of the present invention the method further comprising the step of:

e) determining the cadence value from the rate at which consecutive extreme values occur in the envelope of the second acceleration signal.

This allows determining the cadence in an alternative way, especially in situations where the transmission ratio between the chain wheel and the wheel to which the sensor apparatus is attached is large, e.g. on the order of three or more, which is typically the case at high speeds.

In further embodiments of the present invention the method further comprises the step of:

f) determining a more accurate and/or more reliable cadence value using the cadence value determined in step c) and the cadence value determined in step e).

Hence, according to the present invention it is suggested to appropriately combine the two determined cadence values in order to come up with a more accurate result or alternatively use either one of the determined cadence values thus taking advantage of redundancy in order to improve the reliability of the method and the associated sensor apparatus in case an acceleration measurement fails in one of the two measurement axes.

Moreover, a 2- or 3-axis accelerometer attached to a wheel of a bicycle both for providing a first signal indicative of a cadence of a crank, wherein the first signal is dependent on a first acceleration along a first measurement axis of the accelerometer oriented substantially parallel to an axle of the wheel, and for further providing a second signal indicative of a travelling speed of the bicycle, wherein the second signal is dependent on a second acceleration along a second measurement axis of the accelerometer oriented substantially perpendicular to the axle of the wheel, is proposed. The present invention makes use of the surprising effect that accelerations resulting from periodic weight transfers of the bicyclist occurring during the pedalling cycle at the rate of the cadence, and accelerations experienced by objects attached to the wheel caused by its rotation, whose rate is directly related to the bicycle's travelling speed, are present in orthogonal directions and can thus be independently measured with the aid of a single 2- or 3-axis accelerometer attached to the wheel of a bicycle.

It is expressly pointed out that any combination of the above-mentioned or hereafter described embodiments, or combinations of combinations, is subject of a further combination. Only those combinations are excluded that would result in a contradiction.

BRIEF DESCRIPTION OF THE DRAWINGS

For the purpose of facilitating the understanding of the present invention, exemplary embodiments thereof are illustrated in the accompanying drawings which are to be considered in connection with the following description. Thus, the present invention may be more readily appreciated. What is shown in the drawings is the following.

Figure 4:
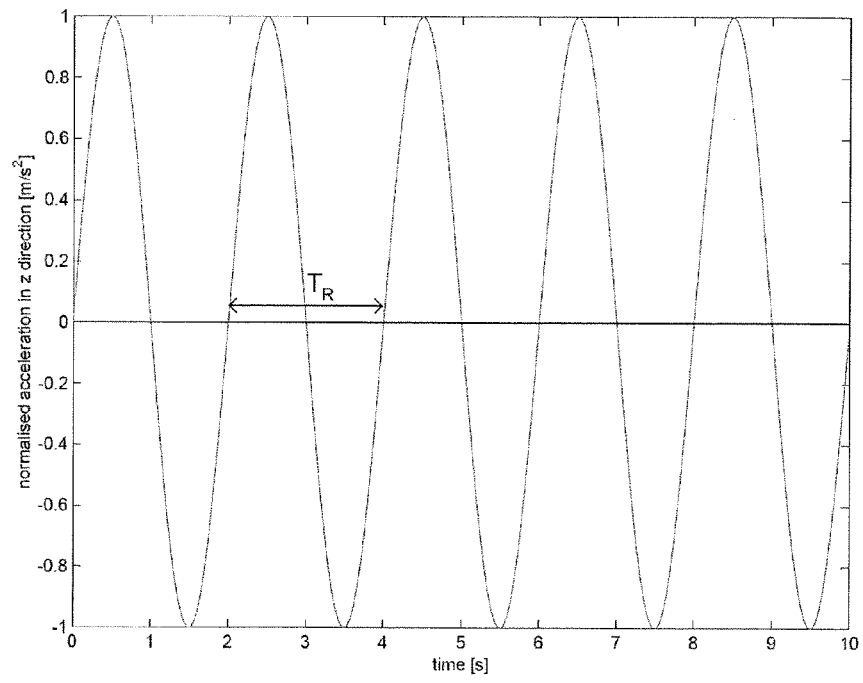
Figure 5:
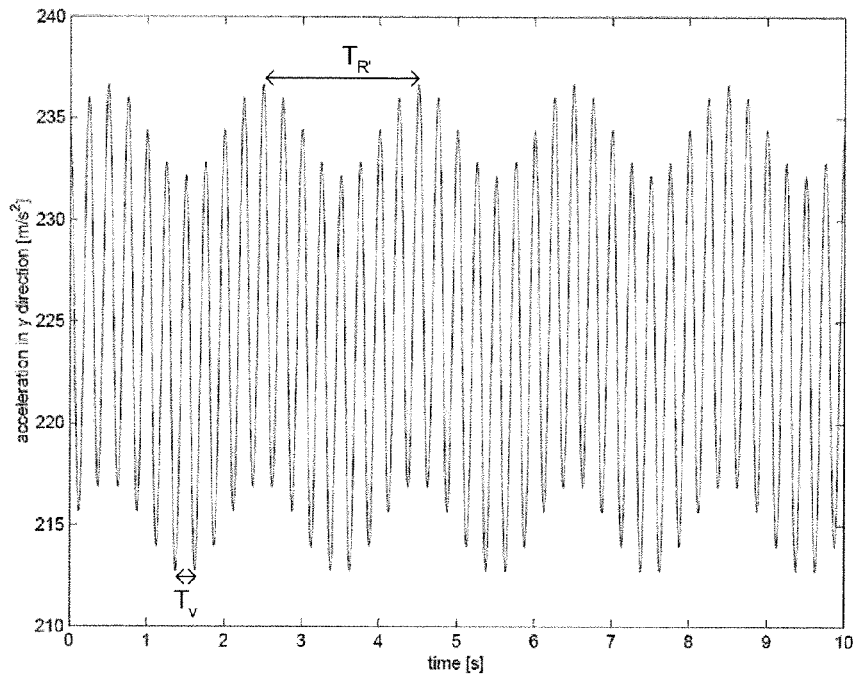

b) shows a cross-section in longitudinal direction of a wheel with a sensor apparatus according to the present invention; and c) shows a longitudinal view of a wheel with a sensor apparatus according to the present invention with the pedals, the cranks and the spindle;

FIG. 4 shows an exemplary plot of the acceleration acting in the direction of the z measurement axis of the accelerometer, i.e. sideways with respect to the plane of the bicycle wheel; and FIG. 5 shows an exemplary plot of the acceleration acting in the direction of the y measurement axis of the accelerometer, i.e. in radial direction to the axle of the wheel.

DETAILED DESCRIPTION OF THE INVENTION

Figure 1:
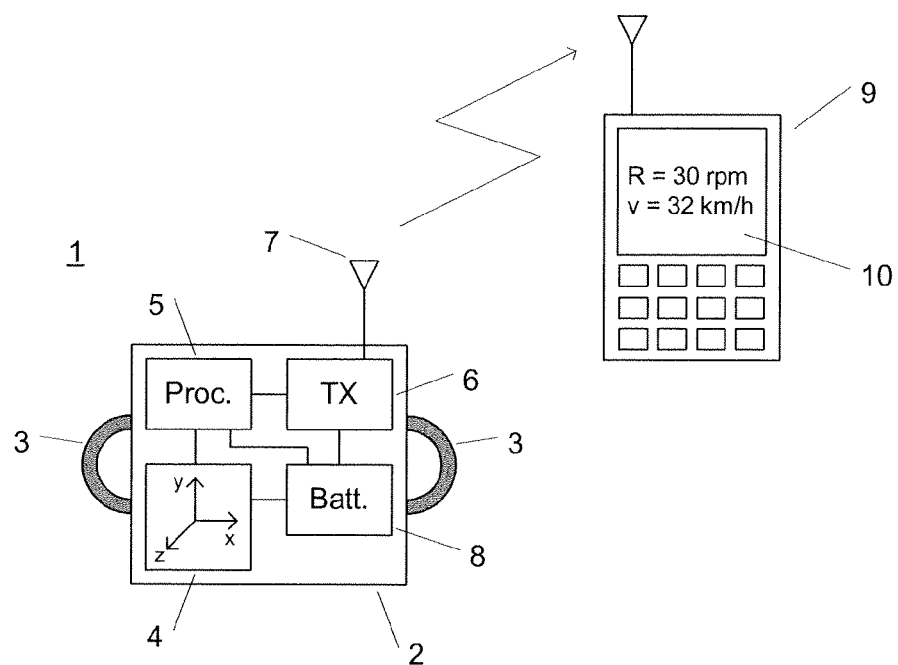
FIG. 1 shows a block diagram of a sensor apparatus according to the present invention.

FIG. 1 depicts a block diagram of a sensor apparatus 1 according to the present invention. The sensor apparatus 1 includes a housing 2 which is attachable to the wheel 11, 11' of a bicycle, e.g. to one or more spokes 12, with an attachment means 3. The housing 2 contains a 2- or 3-axis accelerometer 4 which is connected with a processing unit 5 which in turn is connected with a wireless transmitter 6 having an antenna 7. These three units are powered by a battery 8 or an alternative power source. The wireless transmitter 6 for instance operates according to the ANT/ANT+, Zigbee or Bluetooth standard and can be used to transmit data from the sensor apparatus 1 to a remote device 9 such as for example a bicycle computer, mobile phone or personal digital assistant (PDA). The screen 10 of the remote device 9 can then be used to display the measurement results from the sensor apparatus 1. The remote device 9 can also be employed to store the data received from the sensor apparatus 1 for instance for later analysis and/or downloading to a computer. The processing unit 5 can alternatively be part of the remote device 9, e.g. the processing performed by the processing unit 5 can be implemented as additional tasks running on a microprocessor in the remote unit 9.

Figure 2:
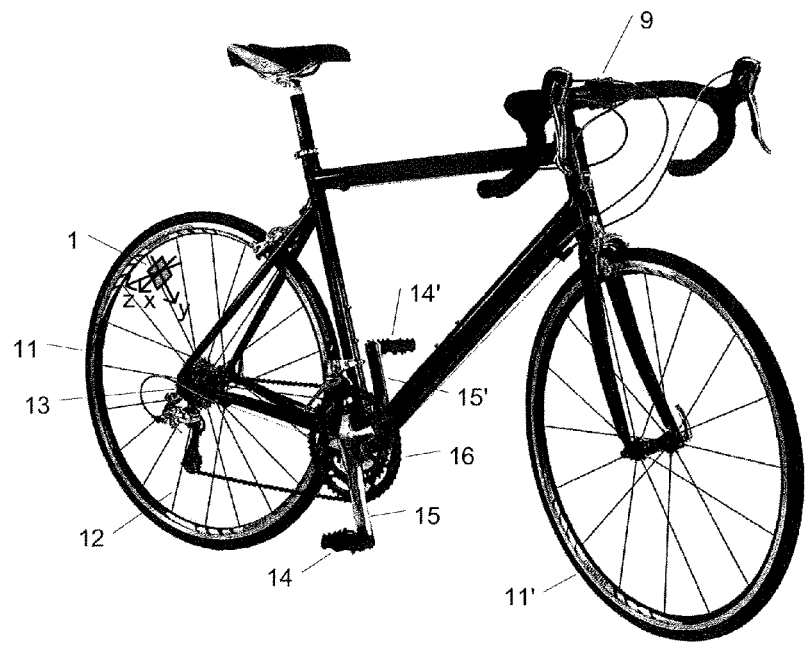
FIG. 2 shows the arrangement of a sensor apparatus according to the present invention at a wheel of a bicycle.

As can be seen in FIG. 2, the sensor apparatus 1 is preferably attached to the rear wheel 11 of a bicycle. Alternatively, the sensor apparatus 1 can also be attached to the front wheel 11'. The sensor apparatus 1 should be mounted to the wheel 11 such that the first measurement axis z of the accelerometer 4 lies substantially parallel to the axle 13 of the wheel 11 and the second measurement axis y of the accelerometer 4 lies substantially perpendicular to the axle 13 of the wheel 11 and preferably intersects the axis a of the axle 13 of the wheel 11, preferably in its centre C. In this way the accelerometer 4 can measure lateral accelerations acting at a right angle to the plane of the wheel 11 along the first measurement axis z as well as radial accelerations with respect to the axle 13 along the second measurement axis y. If the accelerometer 4 provides a third measurement axis x which is orthogonal to the first and second measurement axes z and y then accelerations acting tangentially with respect to circles centred at the centre C of the wheel 11 can also be measured. Accelerometers suitable for the present purpose are readily available from manufacturers such as Analog Devices, Inc., for instance devices like the dual-axis accelerometer ADXL210 or the 3-axis accelerometer ADXL345.

Figure 3:
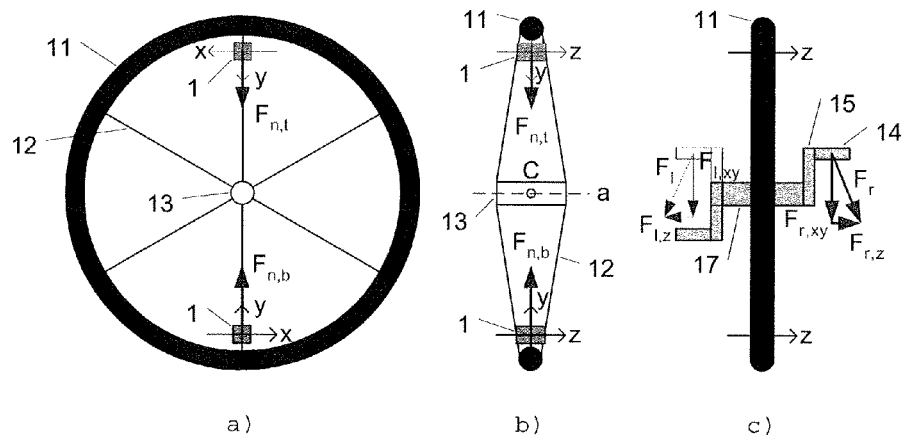
FIG. 3a) shows a sideway view of a wheel with a sensor apparatus according to the present invention.

The forces acting on the accelerometer 4 are shown in FIG. 3. As can be seen in FIGS. 3a) and b) the normal forces $F_{n,b}$ and $F_{n,t}$, respectively, acting on the accelerometer 4 when it is located at the top of the wheel 11 and the bottom of the wheel 11, respectively, have different magnitudes. Accordingly, the radial acceleration measured by the accelerometer 4 during each rotation of the wheel 11 will vary between a maximum value achieved when the accelerometer 4 reaches the bottom position of the revolution and a minimum value achieved when the accelerometer 4 reaches the top position of the revolution. The difference between these two extreme values is dependent on the gravitational acceleration g. When the bicycle is travelling at a constant speed v the measured acceleration in the radial direction (y) will fluctuate between the two extreme values given by $v_{tg}^2(r)/r \pm g$ during each revolution of the wheel 11. Hereby, $v_{tg}(r)$ is the tangential velocity of the point of intersection of the measurement axes x, y and z rotating at a distance r from the centre C of the wheel 11. The time it takes for a complete rotation of the wheel 11 can thus be determined by measuring the elapsed time $T_v$ between two consecutive maxima or minima of the acceleration signal associated with the acceleration along the second measurement axis y. From this the travelling speed can be computed by taking into account the wheel diameter D yielding the travelling speed as $v = D E/T_v$.

FIG. 3c) illustrates the rear wheel 11 as seen from behind together with the pedals 14, 14', the cranks 15, 15' and the spindle 17. As can be seen the left and right pedalling force $F_{l/r}$ consists of a component $F_{l/r,xy}$ parallel to the plane spanned by the second and third measurement axis y and x of the accelerometer 4 and a component $F_{l/r,z}$ at a right angle thereto. The sideways acting force component $F_{l/r,z}$ is due to the lever arm of the force being applied alternately to the left and right pedal 14 and 14' as well as due to the periodic weight transfers of the bicyclist accompanying the pedalling action. This force leads to a sideways "rocking" motion of the bicycle at a rate of the pedalling cadence. The associated lateral acceleration can be measured along the first measurement axis z of the accelerometer 4. An exemplary plot of this lateral acceleration is shown in FIG. 4. The time it takes for a complete cycle of the cranks 15, 15' and the chain wheel 16 can thus be determined by measuring the elapsed time $T_R$ between two consecutive maxima or minima of the acceleration signal associated with the acceleration along the first measurement axis z, yielding the pedalling cadence $R=1/T_R$. Alternatively and more easily, the time $T_R$ can be measured between two consecutive changes of sign/polarity of the acceleration signal associated with the acceleration along the first measurement axis z.

During each pedalling cycle—also referred to as a "pedal stroke"—the bicyclist applies a force of continuously varying strength, as follows. The period of greatest muscle activity resulting in the highest pedalling force, therefore known as the "power phase", is the portion of the pedal stroke from 12 o'clock to about 5 o'clock, i.e. the downstroke. During this phase the bicycle slightly accelerates and temporarily picks up speed. Lesser force is applied to the pedal during the subsequent phase which acts as a transition to the backstroke—hence the bicycle slightly de-accelerates and loses speed again. During the upstroke the other leg takes over and applies force to the opposite pedal. This periodic acceleration and de-acceleration in the travelling direction is also registered by the accelerometer 4 along its second and third measurement axis y and x. An exemplary plot of the variation in radial acceleration (i.e. along the second measurement axis y of the accelerometer 4) is shown in FIG. 5. As can be seen the envelope of the acceleration signal varies at a rate according to the pedalling cycle, i.e. the cadence. By measuring the time $T_R$, between consecutive maxima or minima in the envelope of the acceleration signal associated with the acceleration in direction of the second measurement axis y the period of the pedal stroke $T_R = 1/R'$ can be determined. Simultaneously, the travelling speed can be determined by measuring the time $T_v$ between consecutive maxima or minima in the acceleration signal. The plots depicted in FIGS. 4 and 5 are for a situation where the pedalling cadence is R=30 revolutions per minutes (rpm) or R=0.5 revolutions per second, resulting in a speed of approximated 32 km/h with a transmission ratio of 8 (i.e. a wheel revolution rate of 240 rpm or 4 revolutions per second) for wheels having a diameter D=71.12 cm (i.e. 28 inches). The sensor apparatus 1 was thereby positioned at a distance r=71.12 cm from the centre C of the wheel 11, i.e. at the wheel rim.

This value R' for the cadence determined from the acceleration signal associated with the second measurement axis y—as well as also the value R" for the cadence determined from the acceleration signal associated with the third measurement axis x of the accelerometer 4—can be used as an alternative to the value R for the cadence determined from the acceleration signal associated with the first measurement axis z, for instance when no measurement is possible along the measurement axis z due to a partial malfunction or damage of the accelerometer 4. Alternatively, the values R and R'—as well as R"—can be combined in order to improve the accuracy of the result regarding the cadence. It should however be noted that determination of R' and R" is difficult for low transmission ratios, e.g. below a factor of 3, since the extraction of the envelope becomes more challenging when the frequency of the envelope is close to the frequency of the signal being enveloped.

The mean value of the acceleration signal associated with the acceleration in the direction of the second measurement axis y of the accelerometer 4 is proportional to $v_{tg}^2(r)/r$ ($=4\pi^2 r/T_v^2$), i.e. it is dependent on the tangential velocity of the accelerometer (i.e. along its x axis) rotating on the wheel at a distance r from the centre C. Hence, it is also possible to determine the travelling speed v ($=v_{tg}D/2/r$) from the mean value of the aforementioned acceleration signal. This is achieved for instance with the aid of calibration, i.e. by making prior measurements of the mean value of the aforementioned acceleration signal for different travelling speeds v, and then using this data during operation of the sensor apparatus 1 to determine the momentary travelling speed v from the measured average acceleration signal, for example by employing a table containing average acceleration values and corresponding velocity values.

LIST OF REFERENCE SYMBOLS 1 sensor apparatus
2 housing
3 attachment means for attaching the housing to a bicycle wheel
4 accelerometer
5 processing unit/means
6 wireless transmitter
7 antenna
8 battery/power source
9 remote device (e.g. bicycle computer, mobile phone, personal digital assistant)
10 screen 11, 11' wheel (rear/back & front)
12 spoke
13 wheel axle
14, 14' pedal (right & left)
15, 15' crank (right & left)
16 chain wheel
17 spindle
a axis of the wheel axle
C centre of the wheel/axle
D wheel diameter
g gravitational acceleration
$F_{n,b}$, $F_{n,t}$ normal force (at bottom & top of wheel revolution)
$F_l$, $F_{l,xy}$, $F_{l,z}$ $F_r$, $F_{r,xy}$, $F_{r,z}$ left & right pedalling force (total and components in x/y plane & z direction)
r distance of the point of intersection of the axes x, y, z to the centre C
R, R', R'' pedalling cadence
$T_R$, $T_{R'}$ time required for a complete pedalling cycle
$T_v$ time required for a complete revolution of the wheel
v travelling speed
$v_{tg}(r)$ tangential velocity of a point on the wheel at a distance r from the centre C
x, y, z measurement axes (3rd, 2nd, 1st) of the accelerometer

The invention claimed is:

1. A sensor apparatus (1) for determining both a cadence of a crank (15, 15') and a travelling speed of a bicycle, comprising:
   a. a housing (2);
   b. an accelerometer (4) with a first and second measurement axis (z, y) arranged substantially perpendicular to one another, arranged for providing a first signal dependent on a first acceleration along the first measurement axis (z) and a second signal dependent on a second acceleration along the second measurement axis (y);
   c. a wireless transmitter (6);
   d. a power source (8);
wherein the accelerometer (4), the wireless transmitter (6) and the power source (8) are contained in the housing (2), and wherein the housing (2) comprises an attachment means (3) arranged for attaching the housing (2) to a wheel (11, 11') of the bicycle, and wherein the sensor apparatus (1) further comprises a first means arranged for determining the cadence from the rate at which consecutive changes of polarity occur in the first signal, or from the rate at which consecutive positive and negative extreme values occur in the first signal, and a second means arranged for determining the travelling speed from the rate at which consecutive maximum and minimum peak values occur in the second signal.

2. The sensor apparatus (1) according to claim 1, further comprising a third means for determining the cadence from the rate at which consecutive maximum and minimum peak values occur in the envelope of the second signal.

3. The sensor apparatus (1) according to claim 2, further comprising a fourth means for determining a more accurate and/or more reliable cadence value using the cadence value determined by the first means and the cadence value determined by the third means.

4. A bicycle wheel (11, 11') with a sensor apparatus (1) according to claim 1, wherein the first measurement axis (z) is oriented substantially parallel to the axle (13) of the wheel (11, 11') and the second measurement axis (y) is oriented substantially perpendicular to the axle (13).

5. The bicycle wheel (11, 11') according to claim 3, wherein the second measurement axis (y) intersects the axis (a) of the axle (13).

6. The sensor apparatus (1) according to claim 1, wherein the first and second means are part of a bicycle computer (9) or a portable device such as for instance a mobile phone or a personal digital assistant.

7. A bicycle with a sensor apparatus (1) according to claim 1, wherein the housing (2) is attached to a rear wheel (11) of the bicycle and wherein the first measurement axis (z) is oriented substantially parallel to the axle (13) of the wheel (11, 11') to which the sensor apparatus (1) is attached and the second measurement axis (y) is oriented substantially perpendicular to the axle (13) of the wheel (11, 11') to which the sensor apparatus (1) is attached.

8. The bicycle according to claim 7, wherein the second measurement axis (y) intersects the axis (a) of the axle (13) of the wheel (11, 11') to which the sensor apparatus (1) is attached.

9. A bicycle with a sensor apparatus (1) according to claim 1, wherein the housing (2) is attached to a wheel (11, 11') of the bicycle and wherein the first measurement axis (z) is oriented substantially parallel to the axle (13) of the wheel (11, 11') to which the sensor apparatus (1) is attached and the second measurement axis (y) is oriented substantially perpendicular to the axle (13) of the wheel (11, 11') to which the sensor apparatus (1) is attached.

10. A method for determining both a cadence of a crank (15, 15') and a travelling speed of a bicycle using an accelerometer (4) attached to a wheel (11, 11') of the bicycle such that a first measurement axis (z) of the accelerometer (4) is oriented substantially parallel to an axle (13) of the wheel (11, 11') and a second measurement axis (y) of the accelerometer (4) is oriented substantially perpendicular to the axle (13), comprising the steps of:
   a. measuring a first signal dependent on a first acceleration along the first measurement axis (z);
   b. measuring a second signal dependent on a second acceleration along the second measurement axis (y);
   c. determining the cadence value from the rate at which consecutive changes of polarity occur in the first signal, or from the rate at which consecutive positive and negative extreme values occur in the first signal;
   d. determining the travelling speed value from the rate at which consecutive positive and negative extreme values occur in the second signal.

11. The method according to claim 10, further comprising the step of:
   e. determining the cadence value from the rate at which consecutive extreme values occur in the envelope of the second signal.

12. The method according to claim 11, further comprising the step of:
   f. determining a more accurate and/or more reliable cadence value using the cadence value determined in step c) and the cadence value determined in step e).

13. A method of using a 2- or 3-axis accelerometer (4) attached to a wheel (11, 11') of a bicycle, wherein the accelerometer is arranged for providing a first signal dependent on a first acceleration along a first measurement axis (z) of the accelerometer (4) oriented substantially parallel to an axle (13) of the wheel (11, 11'), and for further providing a second signal dependent on a second acceleration along a second measurement axis (y) of the accelerometer (4) oriented substantially perpendicular to the axle (13) of the wheel (11,11'), comprising:
   determining a cadence of a crank (15, 15') of the bicycle from the rate at which consecutive changes of polarity occur in the first signal, or from the rate at which consecutive positive and negative extreme values occur in the first signal; and determining a travelling speed of the bicycle from the rate at which consecutive maximum and minimum peak values occur in the second signal.

* * * * *

UNITED STATES PATENT AND TRADEMARK OFFICE
CERTIFICATE OF CORRECTION

PATENT NO. : 9,075,076 B2  
APPLICATION NO. : 13/879219  
DATED : July 7, 2015  
INVENTOR(S) : Herbert Baechler Page 1 of 1

It is certified that error appears in the above-identified patent and that said Letters Patent is hereby corrected as shown below:

In the specification, column 7, line 28, please replace "$v = DE/T_v$" with -- $v = D\Pi/T_v$ --

In the claims, claim 5, line 65, please replace "according to claim 3" with -- according to claim 4 --

Signed and Sealed this  
Fifth Day of April, 2016

Michelle K. Lee  
*Director of the United States Patent and Trademark Office*